United States Patent
Braat et al.

[11] Patent Number: 5,732,065
[45] Date of Patent: Mar. 24, 1998

[54] OPTICAL INFORMATION CARRIER INCLUDING STANDARD AND HIGH DENSITY LAYERS

[75] Inventors: Josephus J. M. Braat; Gerardus J. J. Vos, both of Eindhoven, Netherlands

[73] Assignee: U.S. Philips Corporation, New York, N.Y.

[21] Appl. No.: 709,402

[22] Filed: Sep. 4, 1996

[30] Foreign Application Priority Data

Sep. 8, 1995 [EP] European Pat. Off. ............. 95202445

[51] Int. Cl.$^6$ .............................. G11B 3/70; G11B 3/74
[52] U.S. Cl. .............................. 369/275.1; 369/94
[58] Field of Search .............................. 369/275.1, 275.2, 369/275.3, 275.4, 94, 93, 100, 109

[56] References Cited

FOREIGN PATENT DOCUMENTS

0520619A1 12/1992 European Pat. Off. .
0745985 12/1996 European Pat. Off. .

OTHER PUBLICATIONS

G. Bouwhuis et al, "Principles of Optical Idisc Systems", ISBN 0-85274-785-3, pp. 7-87.

*Primary Examiner*—Paul W. Huber
*Attorney, Agent, or Firm*—Edward Blocker

[57] ABSTRACT

A record carrier having standard and high-density information layers. The standard density layer, e.g. in a standard CD format, is positioned at the bottom of a substrate, and is read out through the substrate with a laser beam. The thickness of the substrate is within the CD specification, e.g. 1.2 mm. At least one high-density layer is formed by a material which is (nearly) transparent for the laser wavelength of standard CD players ($\lambda$=780 nm), but is (at least partially) reflective for shorter wavelengths used for high-density discs ($\lambda$=635 nm). To achieve a high density, a smaller track pitch and smaller pits are used in the high-density layer(s). To achieve better reading signals from both layers, the high-density layer is positioned closer to the side of entrance of the laser beam in the substrate. A higher numeric aperture of the focusing lens and, therefore, a smaller spot for the shorter wavelength results. The high-density layer is preferably positioned midway in the substrate, e.g. at 0.6 mm. Such high-density layer configuration is compatible with two-sided high-density discs which have a total thickness of 1.2 mm. The information content of the standard layer may be duplicated on the high-density layer, or it may be represented by a different coding scheme.

25 Claims, 1 Drawing Sheet

5,732,065

OPTICAL INFORMATION CARRIER INCLUDING STANDARD AND HIGH DENSITY LAYERS

BACKGROUND OF THE INVENTION

The invention relates to an information carrier comprising a substrate and information layers having optically readable effects which effects represent information, which information layers comprise a standard layer having effects of standard information density readable by an optical beam formed by light of a first wavelength, the beam, upon reading, entering on an entrance side of the substrate, the standard layer being located opposite the entrance side, and a high-density layer having effects of high information density, the high-density layer being substantially transparent to the optical beam of the first wavelength, the high-density layer being at least partially reflective to light of a second wavelength suitable for reading effects of high information density.

Such a multilayer information carrier is known from EP-0 520 619. The described optical recording medium comprises two recording layers separated by a support layer on a substrate. The first recording layer is reflective to light of a first wavelength and transparent to light of a second wavelength and the second recording layer is reflective to the light of the second wavelength. Information can be read from a layer through the substrate by focusing a beam of an appropriate wavelength on the respective layer, scanning the effects and transforming the reflected light into a read signal. The information is recovered from the read signal by detecting the changing of an optical characteristic of the reflected light. A recorded layer comprises either standard-density or high-density optically readable effects. A problem of the known disc is, that during reading the second layer there is a disturbance in the read signal caused by the first layer, which has to be passed twice by the beam. This may cause errors in the recovered information.

SUMMARY OF THE INVENTION

It is an object of the invention to provide an information carrier in which, upon reading, the quality of the read signal is improved. For this purpose, the information carrier according to the invention is characterized in that the high-density layer is located between the standard layer and the entrance side, the distance between the high-density layer and the entrance side being substantially smaller than the distance between the standard layer and the entrance side. This has the advantage, that the read signal when reading the standard layer is less disturbed.

The invention is also based also on the following recognition. While reading the standard layer the optical beam has a larger diameter when passing a high-density layer spaced apart compared to the diameter when using a set of layers spaced closely on one side of the substrate. The irregularities in the high-density layer, such as recorded effects, repetitively recorded data or header patterns, will hardly affect the read signal. However the read signal from the high density layer may be impaired by dust particles and scratches on the surface for the same reason. So the high density layer should be located closer to the entrance side, but not too close to prevent impairment by dust, etc.

A further advantage is a better quality of the read signal when reading the high-density layer. The size of the spot as focused on a layer is a function of the wavelength of the optical beam and the NA (numeric aperture) of the focusing lens. However, if the NA is increased to decrease the spot size, it is necessary to reduce the substrate thickness in order to reduce the influence of disc tilt on the quality of the radiation beam. A smaller spot results in less interference from adjacent effects and a better read signal. Alternatively, a higher information density (using the same wavelength and the same optical requirements) may be attained, because a reduced-size scanning spot allows smaller effects to be used, e.g. smaller pits in tracks with a smaller track pitch. A further advantage of the greater distance between the standard layer and the high-density layer is, that players not arranged for playing multilayer records, are less likely to be disturbed by the other layer, e.g. may in error try focusing their beam on the wrong layer. This applies for example to a standard CD player reading the standard layer and to a high-density player not arranged for discriminating between layers and therefore only reading the high-density layer. Also portable players, when subject to shocks, will less likely focus on a wrong layer.

An embodiment of the information carrier is characterized in that the distance between the high-density layer and the entrance side is substantially equal to half the distance between the standard layer and the entrance side. This has the advantage, that there is a balance between decreasing the disturbing effects when reading the standard layer and increasing the disturbance from dust and surface defects when reading the high-density layer. A further advantage is, that when manufacturing the information carrier, two substrate layers of the same thickness supporting the information layers are to be processed.

Another embodiment of the information carrier is characterized in that the distance between the standard layer and the entrance side is about 1.2 mm. This has the advantage, that a disc according to the CD standard can be formed, being playable on standard CD players and on high-density players.

A further embodiment of the information carrier is characterized in that the high-density layer is partly transmissive to light of the second wavelength enabling the standard layer to be scanned. This has the advantage, that a high-density player may be arranged for reading the standard layer.

Yet another embodiment of the information carrier is characterized in that the high-density layer is substantially fully reflective to light of the second wavelength. This has the advantage, that a high-density player not being arranged for reading the standard layer, will not be disturbed by the presence of the standard layer, as this layer is substantially invisible at the second wavelength.

Still another embodiment of the information carrier is characterized in that the high-density layer accommodates amongst other things the same information as the standard layer. This has the advantage, that there is no need for a high-density player to change layers when using the information.

Still a further embodiment of the information carrier is characterized in that the high-density layer accommodates information recorded in the standard layer which information is coded differently from the information in the standard layer. This has the advantage, that while a standard player can present certain information, an improved version of the same information can be presented by the high-density player.

Yet a further embodiment of the information carrier is characterized in that the information carrier comprises two substrate layers separated by a bonding agent, the substrate layers each supporting an information layer. This has the advantage, that each substrate supports an information layer and can be processed separately, e.g. optical readable effects can be pressed in both substrates. The information carrier is easily formed by finally bonding the two sections together.

BRIEF DESCRIPTION OF THE DRAWINGS

These and other aspects of the invention will be apparent from and elucidated with reference to the embodiments described hereinafter.

In the drawings.

DETAILED DESCRIPTION OF THE PREFERRED EMBODIMENTS

Figure 1:
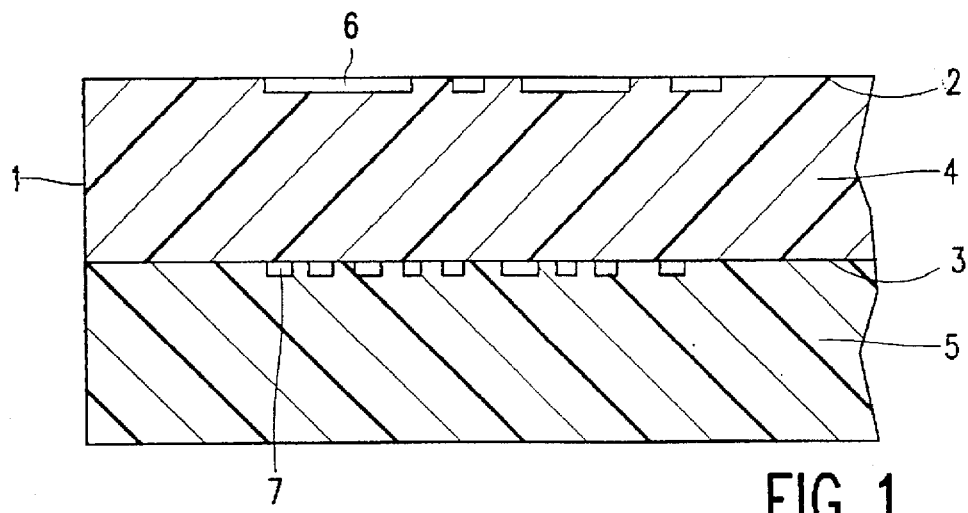
FIG. 1 shows the layer structure of a new information carrier.

FIG. 1 shows an information carrier according to the invention. The carrier may be disc-shaped like the known audio CD, but may be shaped alternatively like optical tape or card. A description of the standard CD can be found in the title "Principles of optical disc systems" by Bouwhuis et at. ISBN 0-85274-785-3. The information carrier according to the invention comprises a first substrate layer 5 which accommodates at least one high-density information layer 3. The high-density information layer 3 is substantially transparent to a first wavelength, e.g. infrared radiation (for example, $\lambda=780$ nm), but shows at least partially reflection for a second, shorter, wavelength, e.g. red laser radiation (for example, $\lambda=635$ nm). The high-density layer 3 comprises optically readable effects 7 of a high-density. The effects may be bumps or pits or other optically detectable effects, for example like phase change or MO (magneto optical) recording. Subsequently, the first substrate 5 is followed by a second substrate 4 on which a standard density information layer 2 is provided. The standard density layer 2 comprises optically readable effects 6 of a low density having relatively large dimensions. The substrates together provide the mechanical stiffness of the information carrier as a whole, although not necessarily in equal amounts. The total structure has a relatively large distance between high-density and standard layer, compared to the known multilayer structure of EP 0520619. The information layers are to be scanned by an optical beam entering through the first substrate (from the bottom side in FIG. 1). When scanning the high density layer with a beam of radiation of the second wavelength sufficient radiation is reflected for detecting the effects of the high-density layer. When scanning the standard density layer with a beam of radiation of the first wavelength substantially all radiation, e.g. 70%, is reflected for detecting the effects of the standard layer. In scanning the standard layer the beam of the first wavelength passes the high-density layer twice and it may be reflected for a small portion by the high density layer. However, as there is a relative large distance between the focal plane and the high-density layer, irregularities such as recorded effects, header patterns or repetitive data patterns are hardly affecting the reflected radiation, as they are averaged out by the relatively large diameter of the beam when crossing the layer on a large distance from the focal plane. Moreover, players arranged only for reading a standard information layer on a specific depth, such as CD players for CD with a substrate thickness of 1.2 mm, are not affected in their operation if a minimum distance is kept between the layers of about 300 μm, ,i.e. 25%, of the total substrate thickness. However the distance between the high density layer and the entrance side of the substrate must be a minimal value H for limiting the adverse effects of dust particles and fingerprints on the surface. It has been found, that the safe minimal value H is dependent on the NA (numerical aperture of the focusing lens), and can be expressed as H >84/NA. For a NA of 0.6 a minimal value H of 140 μm is found. For a disc compatible to the CD the high-density layer or layers should therefore have a distance between 140 μm and 900 μm from the entrance side, i.e. between circa 10% and 70% of the total substrate thickness.

An embodiment of the information carrier according to the invention has the high-density layer substantially halfway between the entrance side and the standard layer. This has been found to be a good compromise between the need to increase the distance between the standard layer and the high-density layer and the need to keep the distance between the surface of the substrate at the entrance side and the high density layer as large as possible.

An embodiment of the information carrier according to the invention has a total thickness of the two carrier substrates of about 1.2 mm, the standardized substrate thickness for CD discs. The standard density layer is a CD information layer and comprises a highly reflective mirror layer that properly reflects both infrared and red laser radiation and meets the minimum reflection requirement for CD with $\lambda \approx 800$ nm, i.e. 70%. A well-known material for the mirror layer is Aluminium. In combination with the previous embodiment an information carrier comprises two substrate layers of about 600 μm thickness (practical range of 500–700 μm).

Figure 2:
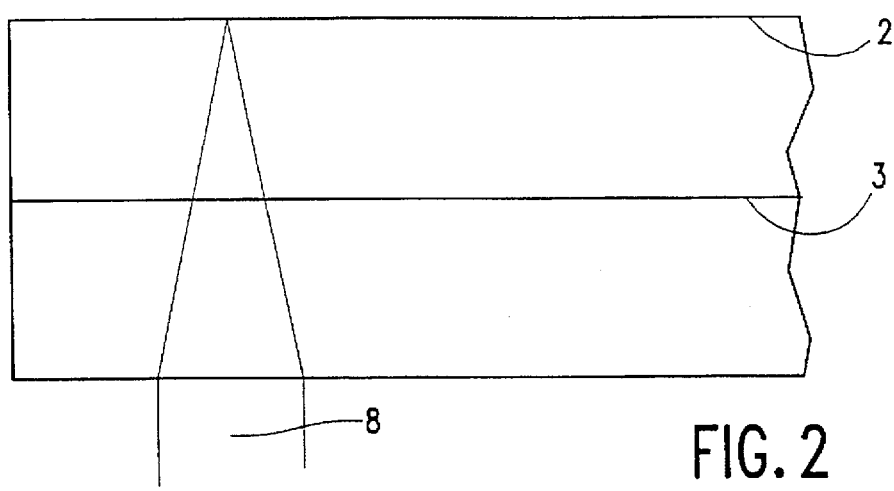
FIG. 2 shows an information carrier with a beam of a standard CD player.

FIG. 2 shows the disc with a beam 8 having a first wavelength, e.g. of a standard CD player. This beam 8 hits the standard layer 2 and is substantially not impeded by the high-density layer or layers 3.

Figure 3:
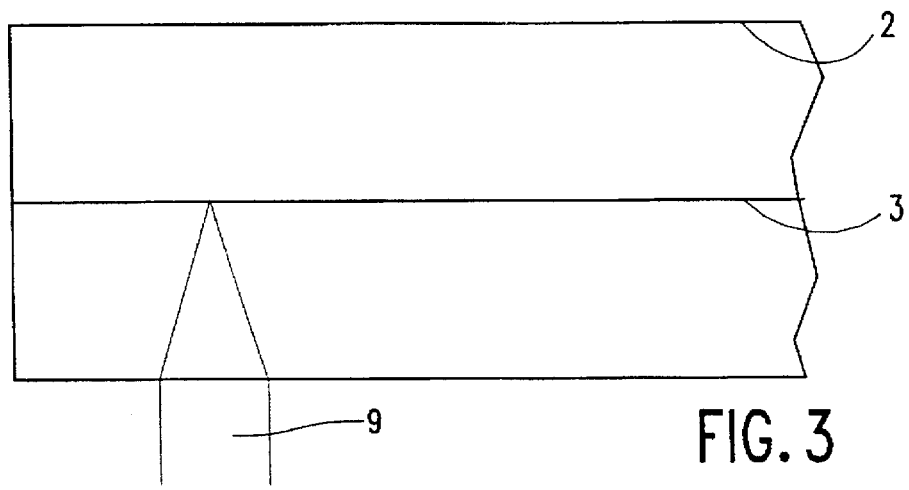
FIG. 3 shows an information carrier with a beam of a HD player.

FIG. 3 shows the disc with a beam 9 of a high-density player having a second wavelength shorter than the first wavelength. The beam 9 hits the high-density layer 3.

In an embodiment of the disc the high density layer is substantially fully reflective to the radiation of the second wavelength. In this case the disc appears to a high-density player as a 'high-density only' disc, as the standard density layer cannot be scanned by the beam of the second (shorter) wavelength. The disc can therefore be played by a 'single-layer only' high density player, as no special measures are necessary to focus on or scan the high-density layer.

In a further embodiment of the disc the high density layer is partially transmissive to the radiation of the second wavelength. In this case it is possible to read all the information layers by focusing on the respective layers. An embodiment of a high-density player that implements such a reading method is disclosed in EP-A-95200619.5. Moreover, the standard information layer having CD density can be read out on a standard CD player without encountering difficulties, provided that the intermediate high-density information layer(s) are sufficiently "invisible" by a low reflection for the first wavelength used by standard CD players. In practice, 70% of the incident light should be returning to a detector reflected by the standard density layer.

In still another embodiment of the disc the high density layer accommodates amongst other things the same information as the standard layer. An example is a CD-ROM, in which the standard layer comprises a basic version of a software package for use on PC's and in which the high-density layer comprises the same software, but also a lot of extensions and additional data-files. A versatile PC with a high-density reader doesn't need to switch between layers, but uses the full-fledged high-density version of the software. Another example is an opera with audio only on the standard layer and audio and video on the high density layer.

In still a further embodiment of the disc the high-density layer accommodates information recorded in the standard layer which information is coded differently from the information in the standard layer. Such a disc comprises certain information, e.g. a musical piece coded in standard CD audio quality on the standard density layer. For high-end audio fans an improved version of the same information is recorded on the high-density layer, e.g. a surround sound version or higher resolution version of the same musical piece.

In yet another embodiment of the disc the information carrier comprises two substrate layers separated by a bonding agent, the substrate layers each supporting an information layer. Each substrate layer has been pressed in a mould and is provided with a respective information layer. The information carrier is formed by bonding the two substrates together by a bonding agent. The bonding agent may also have the function of (at least partially) reflective layer, or the reflective function may be realized by a separate layer applied on the substrate layer beforehand. An embodiment of the disc according to the invention comprises several high density layers. For example one high-density layer may be pressed on the top side of the first substrate 5 and a second high-density layer may be pressed on the bottom side of the second substrate 4. The top side of the second substrate is provided with the standard density layer. Both substrates should be separated by a thin support layer, e.g. the bonding agent. While scanning as shown in FIG. 3 the beam 9 having the second (shorter) wavelength must be focused on one of the high density layers 3.

It will thus be seen that the objects set forth above and those made apparent from the preceding description are efficiently attained, and since certain changes can be made in the above construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

We claim:

1. An information carrier comprising a substrate and information layers having optically readable effects representing information, the information layers including a standard layer having effects of standard information density readable by an optical beam which is formed by light of a first wavelength and which when reading enters on an entrance side of the substrate, the standard layer being located opposite the entrance side, and a high-density layer having effects of high information density, being substantially transparent to the optical beam of the first wavelength and being at least partially reflective to light of a second wavelength suitable for reading effects of high information density, characterized in that the distance between the high-density layer and the entrance side is substantially equal to half or less the distance between the standard layer and the entrance side.

2. The information carrier as claimed in claim 1, wherein the distance between the standard layer and the entrance side is about 1.2 mm.

3. The information carrier as claimed in claim 1, wherein the information carrier comprises two substrate layers separated by a bonding agent, the substrate layers each supporting an information layer.

4. The information carrier as claimed in claim 1, wherein the high-density layer is partly transmissive to light of the second wavelength enabling the effects of standard information density on the standard layer to be scanned by the second wavelength.

5. The information carrier as claimed in claim 4, wherein the information carrier comprises two substrate layers separated by a bonding agent, the substrate layers each supporting an information layer.

6. The information carrier as claimed in claim 4, wherein the high-density layer includes the same information as the standard layer.

7. The information carrier as claimed in claim 6, wherein the recorded information in the high density layer is coded differently from the recorded information in the standard layer.

8. The information carrier as claimed in claim 1, wherein the high-density layer is substantially fully reflective to light of the second wavelength.

9. The information carrier as claimed in claim 8, wherein the information carrier comprises two substrate layers separated by a bonding agent, the substrate layers each supporting an information layer.

10. The information carrier as claimed in claim 8, wherein the high-density layer includes the same information as the standard layer.

11. The information carrier as claimed in claim 10, wherein the recorded information in the high density layer is coded differently from the recorded information in the standard layer.

12. The information carrier as claimed in claim 1, wherein the high-density layer includes the same information as the standard layer.

13. The information carrier as claimed in claim 12, wherein the information carrier comprises two substrate layers separated by a bonding agent, the substrate layers each supporting an information layer.

14. The information carrier as claimed in claim 12, wherein the recorded information in the high density layer is coded differently from the recorded information in the standard layer.

15. The information carrier as claimed in claim 14, wherein the information carrier comprises two substrate layers separated by a bonding agent, the substrate layers each supporting an information layer.

16. The information carrier as claimed in claim 1, wherein the distance between the high-density layer and the entrance side is substantially equal to half the distance between the standard layer and the entrance side.

17. The information carrier as claimed in claim 16, wherein the information carrier comprises two substrate layers separated by a bonding agent, the substrate layers each supporting an information layer.

18. The information carrier as claimed in claim 16, wherein the high-density layer includes the same information as the standard layer.

19. The information carrier as claimed in claim 18, wherein the recorded information in the high density layer is coded differently from the recorded information in the standard layer.

20. The information carrier as claimed in claim 2, wherein the high-density layer is partly transmissive to light of the second wavelength enabling the effects of standard information density on the standard layer to be scanned by the second wavelength.

21. The information carrier as claimed in claim 20, wherein the high-density layer includes the same information as the standard layer.

22. The information carrier as claimed in claim 21, wherein the recorded information in the high density layer is coded differently from the recorded information in the standard layer.

23. The information carrier as claimed in claim 16, wherein the high-density layer is substantially fully reflective to light of the second wavelength.

24. The information carrier as claimed in claim 23, wherein the high-density layer includes the same information as the standard layer.

25. The information carrier as claimed in claim 24, wherein the recorded information in the high density layer is coded differently from the recorded information in the standard layer.

* * * * *